Patented May 11, 1937

2,079,783

UNITED STATES PATENT OFFICE 2,079,783

LUBRICANT

Peter J. Wiezevich, Elizabeth, N. J., assignor to Standard Oil Development Company, a corporation of Delaware No Drawing. Application August 16, 1933, Serial No. 685,493

9 Claims. (Cl. 87—9)

This invention deals with the production of lubricants from aromatic compounds in the relatively pure state, and more specifically it covers the production of superior lubricants by the addition of modifying agents to aromatic types of compounds which do not possess all of the requirements desired of lubricating agents.

Aromatic compounds possess beneficial features which are not present in many oils now used as lubricants. These characteristics are high temperature stability, high auto-ignition temperatures, low oxidation rate and low pour point. The chief disadvantages are their low viscosities and low voscosity indices. The term "viscosity index" refers to the comparative viscosity-temperature relationship as described by Dean and Davis in Chemical and Metallurgical Engineering 36, 618 (1929). It is possible to improve these properties according to this invention, as will be hereinafter set forth, thereby producing valuable lubricants.

The improved lubricants are prepared from a base stock composed at least for the most part of an aromatic compound having a boiling point above 400° F. In many cases it is preferable to also keep the melting point below 200° F. Such materials may be compounds of the type of diphenyl oxide, diphenyl-diphenyl oxide eutectic composed of 20% diphenyl and 80% diphenyl oxide, hexyl phenyl ether, chlorinated diphenyl, chlorinated naphthalene, hydrogenated naphthalene or anthracene, propylated phenanthrene, pine oil, dimethyl naphthalene, voltolized diphenyl or other aromatic compounds subjected to the action of the silent electric discharge, creosote carbonate, diphenylene oxide, and the like. These base stocks are improved by the addition of agents which improve the viscosity or viscosity indices.

For improving the viscosity it is preferable to employ high molecular weight polymerized compounds such as isobutylene polymers and other linear hydrocarbon polymers, also hydrogenated poly-vinyl acetylene, polychlorprene, poly-vinyl esters, ethers and ketones, cellulose esters and ethers, resins such as glyptals, bakelite resins, petroleum resin, thickened glycerides, poly-anhydrides and their esters, lactones and lactides, sulfurized products obtained by reacting hydrocarbon halides with metallic sulfides or polysulfides, voltolized compounds, and the like. The term "voltolization" signifies subjection of the material to the action of the silent electric discharge. This is generally carried out at about 10,000 volts, 60 to 500 cycles and 5 to 20 millimeters vacuum. To obtain the best effect it is desirable to employ a polymer in the neighborhood of 700 to 6000 or even higher molecular weight.

In cases where increase in viscosity index alone is desired, the base stock is blended with a material of high viscosity index, as for example, compounds of the class of animal, vegetable and fish oils, Pennsylvania, extracted, or hydrogenated oils having viscosity indices above 70, but preferably above 100, esters of the dibutyl phthalate type, and the like. When these modifying agents are employed, it is desirable to add them to the aromatic compounds in quantities less than 50%, although in the case of solid aromatic compounds, even higher amounts may be used.

Without any intention of limiting the invention thereby, the following examples are given as illustrations:

Example 1

Diphenyl oxide having a melting point of 176° F. and a boiling point of about 550° F. has a viscosity at 210° F. below 40 seconds Saybolt universal. After blending it with ethyl cellulose (medium viscosity) the following inspection data are obtained:

| Percent ethyl cellulose in blend | Vis. at 100° F. | Vis. at 210° F. | Viscosity index | Flash ° F. | Pour ° F. | Conradson carbon |
|---|---|---|---|---|---|---|
| 2 | 783 | 79 | 98 | | | |
| 5 | 5613 | 389 | 120 | 235 | 40 | 0.317 |

Example 2

A blend of 20% naphthalene and 80% dibutyl phthalate possesses the following properties:

Vis./100° F _____ 46.5
Vis./210° F _____ 31
Flash _____ 245° F.
Pour _____ 25° F.

A blend of 10% naphthalene and 90% dibutyl phthalate has a pour of 0° F. Pure naphthalene melts at 176° F. and boils at 550° F.

Example 3

A blend of 20% diphenyl and 80% dibutyl phthalate possesses the following characteristics:

Vis./100° F_____ 48.5
Vis./210° F_____ 33.5
Flash_____ 280
Pour_____ 10° F.

Pure diphenyl melts at 160° F. and boils at about 490° F.

Example 4

The following inspections were obtained on a blend of 30% diphenyl oxide and 70% dibutyl phthalate:

Vis./100° F_____ 47
Vis./210° F_____ 31.5
Flash_____ 290
Pour_____ —35

Example 5

A sample of chlorinated diphenyl containing about 54% chlorine had the following properties:

Vis./100° F_____ 2555
Vis./210° F_____ 47.5
Flash_____ 405° F.

This material, after the addition of 50% dibutyl phthalate had the following inspection:

Vis./100° F_____ 100
Vis./210° F_____ 36.5
Flash_____ 350° F.
Pour_____ —35° F.
Conradson carbon_____ 0.014

Example 6

Dimethyl naphthalene having a viscosity at 100° F. of 34 seconds and a boiling point of approximately 505° F. was blended with 8% of polyvinyl acetate, and the properties of the resulting mixture were as follows:

Vis./100° F_____ 298
Vis./210° F_____ 78

Example 7

The chlorinated diphenyl in Example 5 was blended with 2% of a polymer obtained by treating isobutylene at low temperatures with boron fluoride (molecular weight of the polymer approximately 6000). The viscosity characteristics were altered as follows:

Vis./100° F_____ 3000
Vis./210° F_____ 63.5

Example 8

A sample of tri-o-cresyl phosphate was heated to about 200° F. and 12½% of tri-ethyl cellulose was gradually added, while stirring. Upon cooling, a grease-like product was obtained which did not ignite spontaneously in air at temperatures as high as 1000° F. This lubricant was found to be especially suitable in certain steel mill operations where ignition is to be avoided.

It will be noted that in many cases the pour of the aromatic compound was reduced to such an extent that the material was made suitable for operation under normal conditions. These modified compounds have been found especially suitable as lubricating oils and as base stocks in the manufacture of greases. For the preparation of lubricating oils, only a small amount of the modifying agent is added, generally in the range of 1 to 10%, while in most cases, the addition of 10 to 20% or even higher percentages causes the formation of grease-like products.

In the case of the lower boiling modified aromatic compounds, such as those containing diphenyl oxide, pine oil and methyl naphthalene, the use is limited to low temperature operation as in the lubrication of turbines, clocks, lathes, and the like. The higher boiling modified compounds such as those containing propylated phenanthrene, polyalkylated naphthalene, and voltolized diphenyl oxide, may be employed for more severe service, as for example, in the lubrication of automobile engines, Diesel engines, automatic stokers, and the like.

Other materials such as dyes, inhibitors, metallic soaps (such as cobalt naphthenate, aluminum stearate, and manganese oleate), oiliness improvers similar to isopropyl stearate or oxidized wax acids, extreme pressure lubricants, such as corrosive sulfur or chlorine compounds, lead compounds, and the like, may be added to the blends prepared according to this process.

This invention is not limited to the specific examples disclosed or to any mechanism or theory of the action of any of the blending agents, but only by the following claims in which it is my intention to cover the invention as broadly as the prior art permits.

I claim:

1. A lubricant comprising essentially a relatively pure aromatic compound selected from the group consisting of hydrocarbons and oxide, hydroxyl, halogen, and condensation derivatives thereof, boiling above 400° F. and a high molecular weight soluble aliphatic linear polymer of a monomeric compound having a single double bond capable of improving the viscosity characteristics of said compound.

2. A lubricant comprising essentially a relatively pure aromatic compound boiling above 400° F., and an aliphatic poly-vinyl compound.

3. A lubricating oil comprising essentially a pure aromatic compound selected from the group consisting of hydrocarbons and oxide, hydroxyl, halogen, and condensation derivatives thereof, boiling above 400° F. and 1 to 10% of a high molecular weight aliphatic linear polymer of a monomeric compound having a single double bond capable of improving the viscosity characteristics of said compound.

4. A lubricating oil according to claim 3 in which the polymer has a melocular weight of 700 to 10,000.

5. A grease-like composition comprising a pure aromatic compound boiling above 400° F. and 10 to 30% of a high molecular weight aliphatic linear polymer of a monomeric compound having a single double bond.

6. A lubricant according to claim 1, in which the viscosity improving material is a high molecular weight polymer made by treatment of isobutylene at low temperature with boron fluoride.

7. A lubricant according to claim 1, in which the aromatic compound is a halogenated compound.

8. A lubricant according to claim 1 in which the aromatic compound is diphenyl oxide.

9. A lubricant according to claim 1 in which the aromatic compound is chlorinated diphenyl.

PETER J. WIEZEVICH.